Patented Mar. 15, 1949

2,464,597

UNITED STATES PATENT OFFICE 2,464,597 m-ACYLACETAMIDOBENZALDEHYDE ACETALS OF ALKANOLS OF 1 TO 4 CARBON ATOMS AND 1,2 AND 1,3-ALKANEDIOLS OF 2 TO 4 CARBON ATOMS

David Malcolm McQueen, Wilmington, Del., assignor to E. I. du Pont de Nemours & Company, Wilmington, Del., a corporation of Delaware No Drawing. Application May 3, 1946, Serial No. 667,126

5 Claims. (Cl. 260—338)

This invention relates to new metadialkoxy- and meta-alkylenedioxy-methylacylacetanilides and to methods for their preparation.

An object of this invention is to provide a new and useful class of chemical intermediates. A related object is to provide a novel class of dye intermediates. A further object is to provide a class of acetals which contain acylacetamide groups and are useful in the preparation of polymeric color formers. A still further object is to provide methods of preparing such compounds in a relatively pure state. Still other objects will be apparent from the following detailed description of the invention.

The above objects are attained and a novel class of compounds provided by condensing a monomeric aliphatic acetal with a beta ketoester. The monomeric acetals comprehended are those of alkanols and alkanediols of not more than 4 carbon atoms. More particularly, they are alkanols of 1 to 4 carbon atoms and 1,2- or 1,3-dihydroxyalkanes of 2 to 4 carbon atoms. The latter compounds are also named 1,2- and 1,3-alkanediols and 1,2- and 1,3-glycols. The novel compounds recovered from the condensation can be considered to be acetals of acylacetamidobenzaldehydes of the formula:

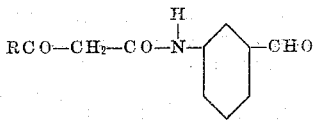

with the aforesaid alkanols and alkanediols.

In the preferred mode of carrying out the invention, a beta-ketoester of a low molecular weight monoalkanol, e. g., ethyl acetoacetate, and an inert high boiling solvent, e. g., chlorobenzene or xylene, and a small amount of an alkaline catalyst, e. g., pyridine, 20% KOH, etc., are heated to a temperature of 100° to 140° C. The acetal of a meta-aminobenzaldehyde, for example, m-aminobenzaldehyde ethylene glycol acetal, is then added. The ethyl alcohol released in the condensation reaction is distilled out of the mixture over a period of two to four hours. After cooling, the reaction mixture is poured into water containing a sufficient amount of sodium hydroxide to dissolve the m-acylacetamidobenzaldehyde acetal. The water layer is separated, washed with a water-immiscible solvent, such as ether, and saturated with carbon dioxide. The acylacetamidobenzaldehyde acetal separates as a solid or, in some cases, an oil. The material may be further purified by repeated extractions or crystallization from suitable solvents.

The m-aminobenzaldehyde acetals used as starting materials may be prepared in any suitable fashion; for example, by the method described in J. Chem. Soc., 121, 76 (1922). However, the preferred method of preparing m-aminobenzaldehyde acetals involves the acetalization of m-nitrobenzaldehyde followed by catalytic reduction with hydrogen.

The following examples are illustrative of the invention and should not be construed as limiting in any way. All parts are by weight.

Example I

A mixture of 480 parts of ethyl benzoylacetate, 1100 parts of chlorobenzene and two parts of 20% sodium hydroxide solution is heated by means of an oil bath to the boiling point and traces of water are removed by distillation. To the boiling solution is added rapidly 415 parts of m-aminobenzaldehyde ethylene glycol acetal. The oil bath temperature is then adjusted (135° to 145° C.) so that the ethanol distills as formed and is removed. After four or five hours, the distillation of alcohol ceases and the reaction mixture is allowed to cool to room temperature. It is then extracted with 2000 parts of 5% sodium hydroxide solution, the chlorobenzene layer is discarded and the aqueous layer is washed once with a water-immiscible solvent. Carbon dioxide is then bubbled into the solution until precipitation is complete. The oil which separates solidifies upon standing for a few hours. The solid mass is broken up, collected on a filter, dried and recrystallized from twice its weight of ethanol. The yield is 650 to 660 parts (84 to 85%) of nearly white solid melting at 92° to 93° C. having the structural formula:

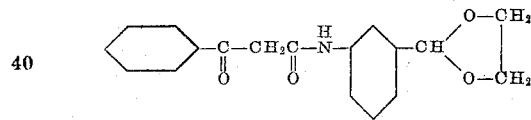

*Analysis.*—Calculated for $C_{18}H_{17}NO_4$: C=69.5; H=5.5; N=4.5. Found: C=69.4; H=5.8; N=4.6.

The above acetal can be hydrolyzed to the aldehyde by dissolving it in acetone and adding a small amount of 1N hydrochloric acid. The m-benzoylacetamidobenzaldehyde separates in small crystals having a melting point of 101° to 102° C.

Example II

A mixture of 425 parts of ethyl acetoacetate, 1.5 parts of dry pyridine and 525 parts of dry xylene is heated to the boiling point and a mixture of 445 parts of m-aminobenzaldehyde ethylene glycol acetal, 3 parts of dry pyridine and 525 parts of xylene is added with stirring over a period of three hours. The ethanol formed is allowed to distill as fast as it is produced. Heating is continued for one hour after addition is complete by which time distillation of ethanol ceases. The reaction mixture is allowed to cool to room temperature and the white crystalline solid is collected on a filter. The cake is slurred in 2600 parts of 5% sodium hydroxide and filtered. The filtrate is saturated with carbon dioxide and the solid is collected on a filter, washed with water, and dried. The yield is 368 parts (58%) of white crystalline solid, melting at 85° to 86° C. having the structural formula:

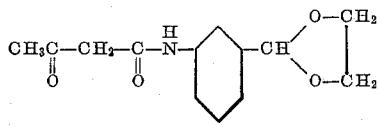

*Analysis.*—Calculated for $C_{13}H_{15}NO_4$: C=62.7; H=6.0; N=5.6. Found: C=62.8; H=6.5; N=5.6.

The acetal can be hydrolyzed by dissolving it in acetone and adding a small amount of 1N phosphoric acid. Upon cooling the m-acetoacetamidobenzaldehyde crystallizes out and can be recrystallized from acetone and has a melting point of 96.5° to 97.5° C.

*Analysis.*—Calculated for $C_{11}H_{11}NO_3$: C=64.4; H=5.4; N=6.8. Found: C=64.4; H=5.5; N=6.8.

*Example III*

A mixture of 170 parts of ethyl furoylacetate, 135 parts of chlorobenzene and one part of 20% sodium hydroxide solution is heated to the boiling point and traces of water are removed by distillation. To the boiling solution is added rapidly 165 parts of m-aminobenzaldehyde dimethyl acetal. The reaction mixture is then heated at such a rate (135° to 140° C.) that the ethanol distills as formed and is removed. After two or three hours the distillation of alcohol ceases and the reaction mixture is cooled and extracted with 800 parts of 5% sodium hydroxide solution. The aqueous layer is washed once with a water-immiscible solvent and carbon dioxide is then passed into it until precipitation is complete. The oil which separates is extracted with ether, dried and the ether is evaporated to give a viscous, yellow product. The yield is 230 parts or about 76% and has the following structural formula:

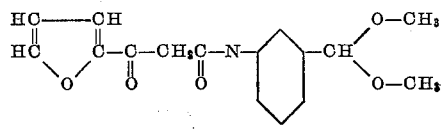

In place of the specific beta-ketoesters and acetals described in the examples, a large series of other compounds may be used. For example, the following materials are of value: methyl acetoacetate, n-propyl acetoacetate, ethyl picolinyl acetate, ethyl propionyl acetate, ethyl gamma-gamma-diethoxyacetoacetate, ethyl oxalacetate, methyl benzoylacetate, ethyl o-anisoylacetate. As examples of m-aminobenzaldehyde acetals suitable for reaction according to the present invention, there may be listed the dimethyl, diethyl, di-beta-chloro-ethyl, di-isopropyl, dibenzyl, 1.3-propyleneglycol, and 1,3-butyleneglycol acetals. Other aminobenzaldehydes which are useful include: p-aminobenzaldehyde, o-aminobenzaldehyde, 2-chloro-3-aminobenzaldehyde, 4-methyl-3-aminobenzaldehyde, 3-amino-2-formylbenzene sulfonic acid, and their low molecular weight acetals. Ketene dimer may be used as an equivalent of acetoacetic acid esters, e. g., ethyl and methyl acetoacetate, if desired.

The new products are useful in the preparation of colored compounds. Thus is, they are suitable for the preparation of dyes to be applied to textiles or other articles. In addition, they are useful in certain processes of color photography. To produce color the compounds of this invention are treated with color-developing agents, such as a diazonium salt or an aromatic nitroso compound, or a p-phenylenediamine in the presence of an oxidizing agent. Since the compounds are acetals, they will react with hydroxylated compounds by an acetal interchange process and thus can be connected to hydroxyl polymers, such as polyvinyl alcohol, partially hydrolyzed polyvinyl acetate, incompletely substituted polyvinyl acetals, cellulose acetate, cellulosic yarns and filters, and the like. They are thus suitable for the preparation of extremely fast-to-washing colors in the case of textile dyes or for the preparation of immobile dye intermediates in color photography.

The cyclic 5-membered ring structure of the ethylene glycol acetals confers added stability to the molecule and permits added leeway in handling the compounds during the preparative reaction and subsequent utilization in reactions involving the acetal group. In addition, the 5-membered ring structure can undergo replacement by the 6-membered ring structure occurring in polyvinyl acetal formation so that the acetalization of polyvinyl alcohol can be carried out under relatively mild conditions similar to those described in United States Patent 2,310,943. Moreover, ethylene glycol is an article of commerce available at low cost in a high state of purity.

An additional advantage of the ethylene glycol acetals is their ease of crystallization. Whereas the dimethyl acetals are all oils, the glycol acetals are solids which can easily be isolated and purified by recrystallization. This is of the utmost importance since only materials of high purity will yield polyvinyl acetals having good solubility and solutions of which will be colorless. Another advantage of the ethylene glycol acetal is that the m-nitrobenzaldehyde acetals from which the m-aminobenzaldehyde acetals are prepared are easier to obtain. Actalization of m-nitrobenzaldehyde with ethylene glycol can be carried out directly, but to get the dimethyl or diethyl acetals, dimethyl sulfite or ethyl orthoformate must be used.

It is surprising that the acetals of the present invention can be prepared from the aminobenzaldehyde acetals in view of the known instability of the aminoacetals toward heat and hydrolytic reagents. In general, the aminoacetals are converted to resins and colored tars very readily and even traces of such colored impurities cannot be tolerated in color photographic chemicals. In spite of this, it has been found that the present compounds can be prepared in good yield and in a high state of purity suitable for utilization in the preparation of elements for three-color photography.

As many widely different embodiments of this invention can be made without departing from the spirit and scope thereof, it is to be understood that the invention is not to be limited except as defined by the appended claims.

What is claimed is:
1. Acetals of the formula:

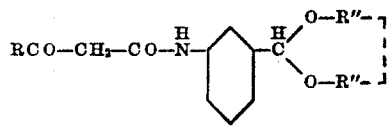

wherein RCO is the acyl radical of a monocarboxylic acid and the radical R'' when not joined is an alkyl radical of 1 to 4 carbon atoms and when joined form a divalent saturated aliphatic hydrocarbon radical of 2 to 4 carbon atoms wherein 2 to 3 atoms only are in the chain between the two oxygen atoms.

2. Acetals of the formula:

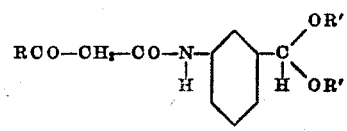

wherein RCO is the acyl radical of a monocarboxylic acid and R' is an alkyl radical of 1 to 4 carbon atoms.

3. Acetals of the formula:

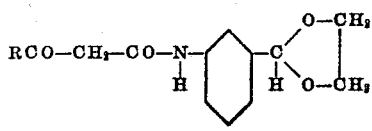

wherein RCO is the acyl radical of a carboxylic acid.

4.

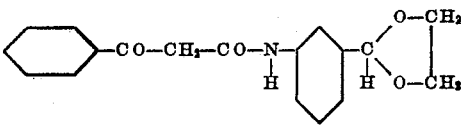

5.

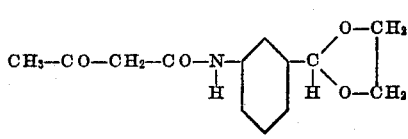

DAVID MALCOLM McQUEEN.

REFERENCES CITED

The following references are of record in the file of this patent:

UNITED STATES PATENTS

| Number | Name | Date |
|---|---|---|
| 2,310,943 | Dorough et al. | Feb. 16, 1943 |
| 2,380,032 | Dorough et al. | July 10, 1945 |
| 2,380,033 | Dorough et al. | July 10, 1945 |

OTHER REFERENCES

Moncrieff, Soap, Perfumery and Cosmetics, 18, 1945, pp. 454–69.